(12) United States Patent
Curelet-Balan

(10) Patent No.: US 8,836,644 B2
(45) Date of Patent: *Sep. 16, 2014

(54) METHOD OF FAST TYPING TWIN SPECIAL CHARACTERS

(71) Applicant: Research In Motion Limited, Waterloo (CA)

(72) Inventor: Gheorghe Curelet-Balan, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/741,822

(22) Filed: Jan. 15, 2013

(65) Prior Publication Data

US 2013/0127732 A1 May 23, 2013

Related U.S. Application Data

(63) Continuation of application No. 13/461,711, filed on May 1, 2012, now Pat. No. 8,384,673, which is a continuation of application No. 13/214,694, filed on Aug. 22, 2011, now Pat. No. 8,194,042, which is a continuation of application No. 12/849,919, filed on Aug. 4, 2010, now Pat. No. 8,026,901, which is a continuation of application No. 11/595,744, filed on Nov. 10, 2006, now Pat. No. 7,791,592, which is a continuation of application No. 10/339,198, filed on Jan. 9, 2003, now Pat. No. 7,167,178.

(51) Int. Cl.
G06F 3/02 (2006.01)
G06F 3/023 (2006.01)

(52) U.S. Cl.
CPC .............. *G06F 3/02* (2013.01); *G06F 3/0233* (2013.01)

USPC .......................................... 345/169; 382/187

(58) Field of Classification Search
USPC .................. 345/168, 169, 172; 382/187, 189; 250/227.22; 200/43.13; 434/227; 700/84; 340/407.2; 715/232, 967; 341/22, 28; 710/8

See application file for complete search history.

(56) References Cited

U.S. PATENT DOCUMENTS

| 5,006,001 A | 4/1991 | Vulcano |
| 5,557,512 A | 9/1996 | Vanko et al. |
| 5,737,618 A | 4/1998 | Nakayama et al. |

(Continued)

FOREIGN PATENT DOCUMENTS

| JP | 63-016367 | 1/1988 |
| JP | 63-115217 | 5/1988 |
| JP | 04-205369 | 7/1992 |

*Primary Examiner* — Abbas Abdulselam

(74) *Attorney, Agent, or Firm* — Finnegan, Henderson, Farabow, Garrett & Dunner LLP

(57) ABSTRACT

A method for inputting characters pairs in an electronic device having a user input device, a display for displaying characters input through the user input device, and a memory for storing characters input through the user input device, including storing a character input through the user input device in the memory and displaying the input character on the display; and determining if the input character is an opening character of a predefined character pair, and if so, automatically and without further user input, causing a corresponding closing character of the predefined character pair to be inserted in the memory and on the display, and locating an input pointer so that subsequently input characters will be inserted between the opening and closing characters in the memory and on the display.

15 Claims, 6 Drawing Sheets

(56) References Cited

U.S. PATENT DOCUMENTS

| | | |
|---|---|---|
| 6,416,329 B1 | 7/2002 | Hirota et al. |
| 7,167,178 B2 | 1/2007 | Curelet-Balan |
| 7,791,592 B2 | 9/2010 | Curelet-Balan |
| 8,026,901 B2 | 9/2011 | Curelet-Balan |
| 8,194,042 B2 | 6/2012 | Curelet-Balan |
| 8,384,673 B2 * | 2/2013 | Curelet-Balan ............... 345/169 |

* cited by examiner

```
j=0;                                    /500
i= cursor position;
Found = false;
While (not found)
{
    j=Display Field (i-1);
    if (j is a closing character)
        push j into top of LIFO stack
    else if (j is an opening character)
    {
        if (stack empty)
        {
            Found = true;
            return j; the opening character
            return i; the location of the opening character
        }
        else if (opening character j corresponds to closing
        character at top of LIFO stack)
            pop the closing character off of the top of the
        LIFO stack
        else
            signal error in character pairing
    }
    decrement i;
} (continue while loop till Found == true)
```

FIG.5

```
k=0;                                    600
n= cursor position;
Found = false;
While (not found)
{
    k=Display Field (n);
    if (k is an opening character)
        push k into top of LIFO stack
    else if (k is a closing character)
    {
        if (stack empty)
            if (k corresponds to opening character j)
            {
                return n; location of the closing character
                Found = true
            } else
                signal error in character pairing
        else If (closing character k corresponds to opening
        character at top of LIFO stack)
            pop the opening character off of the top of the
            LIFO stack
        else
            signal error in character pairing
    }
    increment n;
} (continue while loop till Found == true)
```

FIG.6

METHOD OF FAST TYPING TWIN SPECIAL CHARACTERS

CROSS REFERENCE TO RELATED APPLICATION

This application is a continuation of U.S. application Ser. No. 13/461,711, filed May 1, 2012, which is a continuation of U.S. application Ser. No. 13/214,694, filed Aug. 22, 2011, now U.S. Pat. No. 8,194,042, which is a continuation of U.S. application Ser. No. 12/849,919, filed Aug. 4, 2010, now U.S. Pat. No. 8,026,901, which is a continuation of U.S. application Ser. No. 11/595,744, filed Nov. 10, 2006, now U.S. Pat. No. 7,791,592, which is a continuation of U.S. application Ser. No. 10/339,198, filed on Jan. 9, 2003, now U.S. Pat. No. 7,167,178, the entire contents of all of which are incorporated herein by reference.

BACKGROUND OF INVENTION

The present invention is directed towards a character entry system and method for electronic devices, particularly small mobile devices such as wireless communications devices.

There is generally a need to keep the size of portable electronic devices such as personal wireless communications devices small so that the devices can be worn on the body of the user or otherwise easily carried by the user. As a result, the input mechanism for the portable communications device needs to be small and have a minimal number of keys optimized for use with a minimal number of keystrokes. An example of a hand-held electronic device having a keyboard optimized for use with the thumbs is described in U.S. Pat. No. 6,396,482 issued May 28, 2002, to Griffin et al. and assigned to the assignee of the present invention.

In written communication, there are a number of special characters that are typically "paired" or "twinned" with other characters. For example, left or bracket characters such as "<"; "("; "{"; and "[" are typically paired with respective right bracket characters ">"; ")"; "}" and "]", with the left and right bracket characters (also often referred to as open and close brackets, respectively) enclosing other characters. Similarly, quote characters (") are typically paired together enclosing other characters. In the compressed physical keyboard designs or virtual on-screen keyboard designs of portable electronic devices, entry of such characters can be cumbersome and may require a sequence of entry steps to be taken for each character. Additionally, in a problem not just limited to portable devices, users frequently forget to include the closing or right character of a character pair. There are also situations when an opening sequence of characters is paired with a closing sequence of characters with information nested between. For example HTML source code is structured using paired opening and closing sequences as: <HEAD> opening character sequence paired with the </HEAD> closing sequence, or opening <TITLE> paired with closing </TITLE>, or <TABLE> with </TABLE>.

Thus, there is a need for a method and system that optimizes user input of commonly used character pairs or character sequence pairs, particularly in the context of mobile communications devices.

SUMMARY OF THE INVENTION

According to one aspect of the invention there is provided a method for inputting characters in an electronic device having a user input device, a display for displaying characters input through the user input device, and a memory for storing characters input through the user input device, including (a) receiving a character input through the user input device; and (b) determining if the input character is an opening character of a predefined character pair, and if so adding to the memory and displaying on the display, automatically and without further user input, both the opening character and a corresponding closing character of the predefined character pair. Preferably, if previously input text has been text selected, the opening character and the closing character are added with the selected text framed therebetween, otherwise an input cursor is located so that subsequently input characters will be inserted between the opening and closing characters in the memory and on the display. The method may also be used to automatically insert a closing character sequence when an opening character sequence of a predetermined character sequence pair is entered through the input device.

According to another aspect of the invention, there is provided an electronic device that includes a user input device for allowing a user to input characters, a display for displaying input characters, a memory for storing input characters, and a processor connected to the display screen, the user input device and the memory, for receiving an input signal from the user input device, determining if the input signal corresponds to an opening character of a predefined character pair and if so, causing a corresponding closing character of the character pair to be automatically inserted on the display screen and in the memory in addition to and after the opening character. The processor may also be configured to locate an input cursor so that subsequently input characters input through the user input device will be located between the opening and closing characters.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

Embodiments of the present invention will now be described, by way of example only, with reference to the attached Figures, wherein:

FIG. 5 is a pseudo code representation of a method for locating an opening character of a character pair;

FIG. 6 is a pseudo code representation of a method for locating a closing character of a character pair.

DETAILED DESCRIPTION

Figure 1:
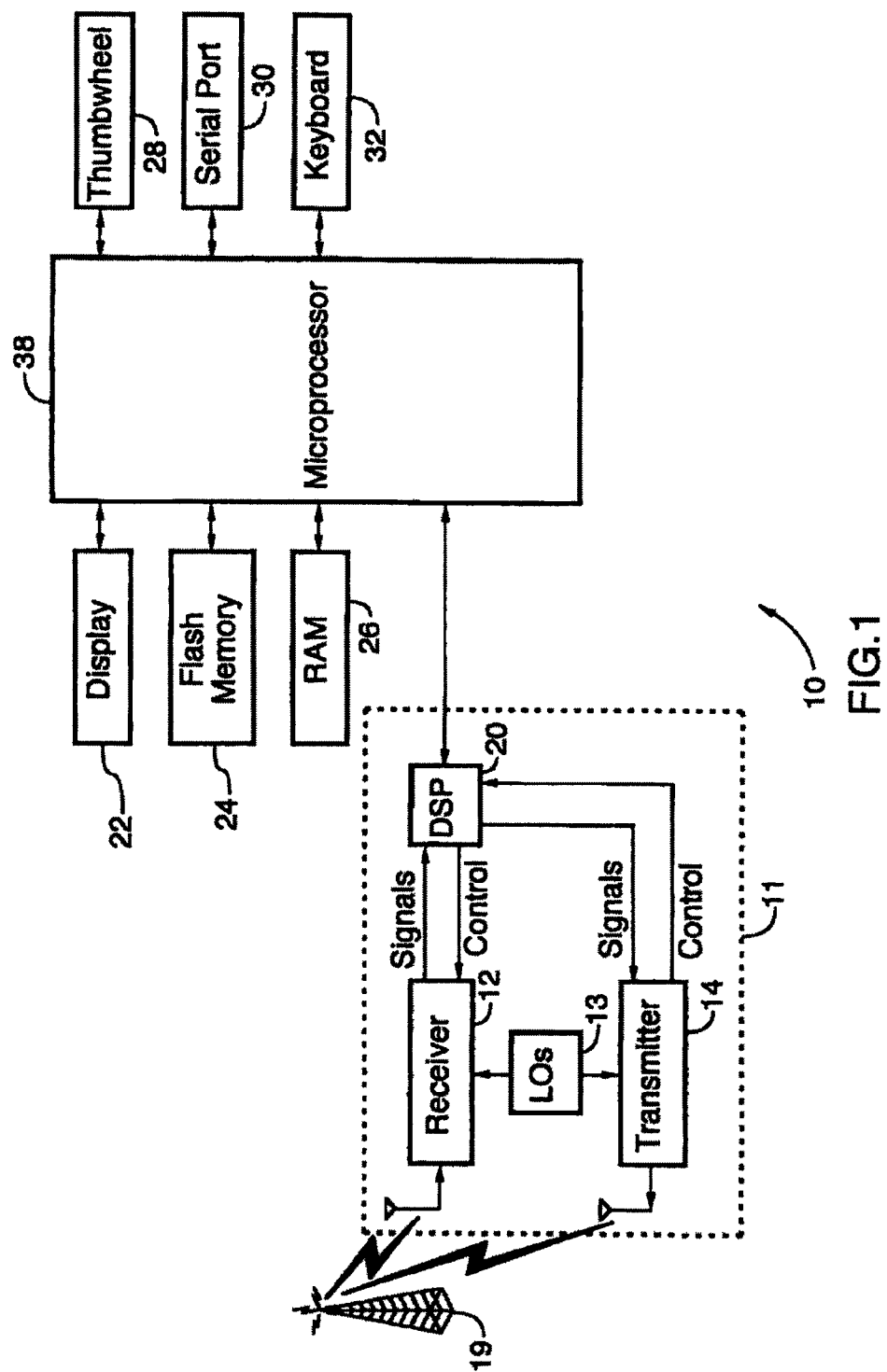
FIG. 1 is a block diagram of a mobile communication device to which the present invention may be applied.

Referring now to the drawings, FIG. 1 is a block diagram of a mobile communication device 10 in which the present invention may be implemented. The mobile communication device 10 is preferably a hand-held two-way communication device having at least data communication capabilities. The device preferably has the capability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities).

Where the device 10 is enabled for two-way communications, the device will incorporate a communication subsystem 11, including a receiver 12, a transmitter 14, and associated components such as one or more, preferably embedded or internal, antenna elements 16 and 18, local oscillators (LOs) 13, and a processing module such as a digital signal processor (DSP) 20. As will be apparent to those skilled in the field of communications, the particular design of the communication subsystem 11 will be dependent upon the communication network 19 in which the device is intended to operate. Network access requirements will also vary depending upon the type of network 19.

Signals received by the antenna 16 through the communication network 19 are input to the receiver 12, which may perform such common receiver functions as signal amplification, frequency down conversion, filtering, channel selection and the like, and in the example system shown in FIG. 1, analog to digital conversion. Communication functions such as demodulation and decoding are performed by DSP 20. In a similar manner, signals to be transmitted are processed, including modulation and encoding for example, by the DSP 20 and input to the transmitter 14 for digital to analog conversion, frequency up conversion, filtering, amplification and transmission over the communication network 19 via the antenna 18.

The DSP 20 not only processes communication signals, but also provides for receiver and transmitter control. For example, the gains applied to communication signals in the receiver 12 and transmitter 14 may be adaptively controlled through automatic gain control algorithms implemented in the DSP 20.

The device 10 preferably includes a microprocessor 38 that controls the overall operation of the device. Communication functions, including at least data communications, are performed through the communication subsystem 11. The microprocessor 38 also interacts with further device subsystems such as the display 22, flash memory 24, random access memory (RAM) 26, auxiliary input/output (I/O) subsystems such as a thumbwheel 28, serial port 30, keyboard 32 and any other device subsystems.

Some of the subsystems shown in FIG. 1 perform communication-related functions, whereas other subsystems may provide "resident" or on-device functions. Notably, some subsystems, such as keyboard 32 and display 22 for example, may be used for both communication-related functions, such as entering a text message for transmission over a communication network, and device-resident functions such as a calculator or task list.

Operating system software used by the microprocessor 38 is preferably stored in a persistent store such as flash memory 24, which may instead be a read only memory (ROM) or similar storage element (not shown). Those skilled in the art will appreciate that the operating system, specific device applications, or parts thereof, may be temporarily loaded into a volatile store such as RAM 26. It is contemplated that received communication signals may also be stored to RAM 26, after processing by communications subsystem 11.

The microprocessor 38, in addition to its operating system functions, preferably enables execution of software applications on the device. A predetermined set of applications that control basic device operations, including at least data communication and input/output applications for example, will normally be installed on the device 10 during manufacture. Further applications may also be loaded onto the device 10 through the network 19, serial port 30 or any other suitable subsystem and installed by a user in the RAM 26 or preferably a non-volatile store such as flash memory 24 for execution by the microprocessor 38.

In a data communication mode, a received signal such as a text message or web page download will be processed by the communication subsystem 11, stored in RAM 26, and input to the microprocessor 38, which will preferably further process the received signal for output to the display 22, or alternatively to an auxiliary device. A user of device 10 may also compose data items such as email messages for example, using the keyboard 32, which is preferably a complete alphanumeric keyboard or telephone-type keypad, in conjunction with the display 22 and possibly thumbwheel 28. Such composed items may then be transmitted over a communication network through the communication subsystem 11.

Figure 2:
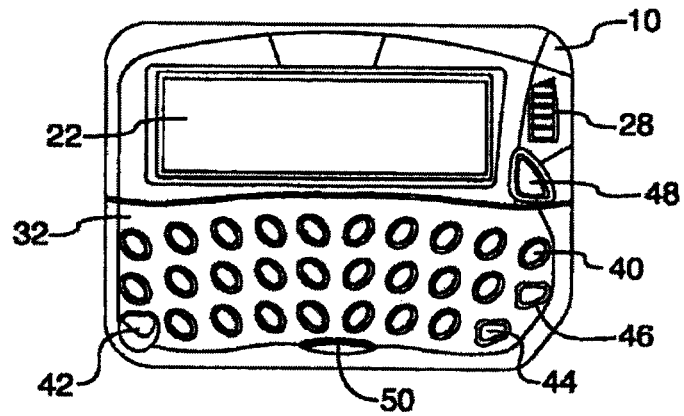
FIG. 2 is a frontal view of the mobile communication device of FIG. 1.

FIG. 2 is a front view of a handheld device 10 in which the present invention may be implemented. The keyboard 32 of device 10 preferably includes a plurality of letter or alphanumeric keys 40, which may be arranged in a conventional QWERTY layout or some other layout. The keyboard 32 also includes specialized keys 42, 44, 46, 48 and a space bar 50. In one embodiment, key 42 is the "Alt" key, key 44 is the "Shift" key, key 46 is the "enter/line feed" key and key 48 is the "backspace" key. Thumbwheel 28 is shown in a vertical association next to screen 22. The thumbwheel 28 and keyboard 32 may each include associated logic circuitry for converting the signals they generate to a format suitable for application to the microprocessor 38. The keyboard 32 and thumbwheel 28 are arranged such that they can be manipulated by the thumbs of a user while the device 10 is held in the palms of the user's hands.

Figure 3:
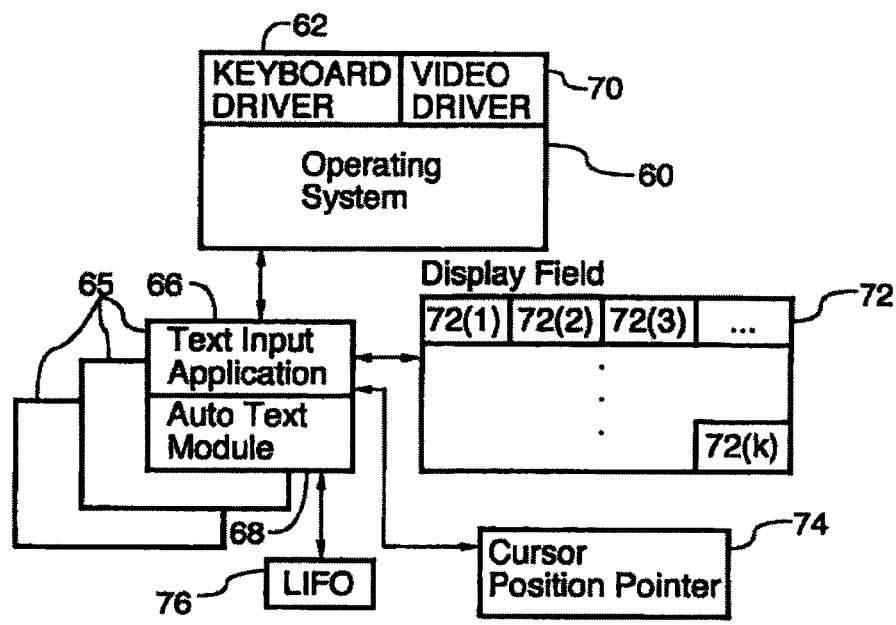
FIG. 3 is a general block diagram showing the major software systems of the communications device.

According to embodiments of the invention, the microprocessor 38 is configured to recognize when the first character of a number of predefined character pairs is entered by a user, and then automatically generate the second character of the pair and place an input cursor to input data between the two characters of the character pair. The microprocessor 38 may also be configured to recognize when the first character of a character pair is entered at the same time that text has been selected, and automatically cause the selected text to be framed by the first character and the corresponding closing character of the character pair. FIG. 3 is a general block diagram of the major software subsystems involved in the autotext function of the present invention. Operating system 60 and various specialized applications 65 contain instructions for microprocessor 38. The operating system 60 includes or communicates with various drivers that act as interfaces between the operating system and the hardware I/O subsystems of device 10. For example, the operating system 60 may include a keyboard driver 62 for receiving input signals from keyboard 32 and logic circuitry associated with the thumbwheel 28, and a video driver 70 for outputting signals to display 22. The operating system 60 is responsible for accepting user inputs from the keyboard 32 and thumbwheel 28 and dispatching those inputs to selected specialized applications 65 that are provided on device 10 for managing different major features of the device. For example, among other things, the device could include a graphical ribbon application, a message compose application, a transport application, an address book application, a device options application, a cryptographic application and a database application, at least some of which are enabled to employ the autotext feature of the present invention.

According to one embodiment of the invention, at least one of the specialized applications 65 (for example, a text message compose application) includes a text input application 66 that is enabled to use the automatic pair character generation feature of the present invention. The text input application 66 is preferably enabled to perform conventional text input and editing functions, including receiving and processing user inputs from the operating system 60 and sending display information back to the operating system 60. According to embodiments of the present invention, the text input application 66 includes an autotext module 68 for facilitating character pair insertions according to the present invention. A display field or buffer 72 is maintained in RAM 26 by the text input application 66. The display field 72 includes a number of memory locations 71(1) . . . 72(k) for storing successive characters that the text input application 66 has received from the keyboard 32 via the operating system 60. When in an active display mode, the text input application 66 causes operating system 60 to display, in sequence, the content of the display field 72 in successive display locations on device display 22, and also to display an input cursor to indicate a current input location both on the screen and in the corresponding display field 72. More particularly, as known in the art, the text input application maintains as a variable in a memory location an electronic pointer 74 to indicate where the next character input should be placed in the display field 72, and the cursor is displayed on the display 22 in a location that corresponds to the location indicated by the pointer 74 in the display field 72—the on-screen cursor is a visual representation of the electronic pointer 74. The text input application 66 also maintains other conventional pointers for conventional functions such as "text select" in which a block of text can be highlighted for copying or deletion or case change or other type block processing. In a preferred embodiment, the text input application 66 also maintains LIFO stacks 76, for tracking character pairs as explained in greater detail below.

Figure 4:
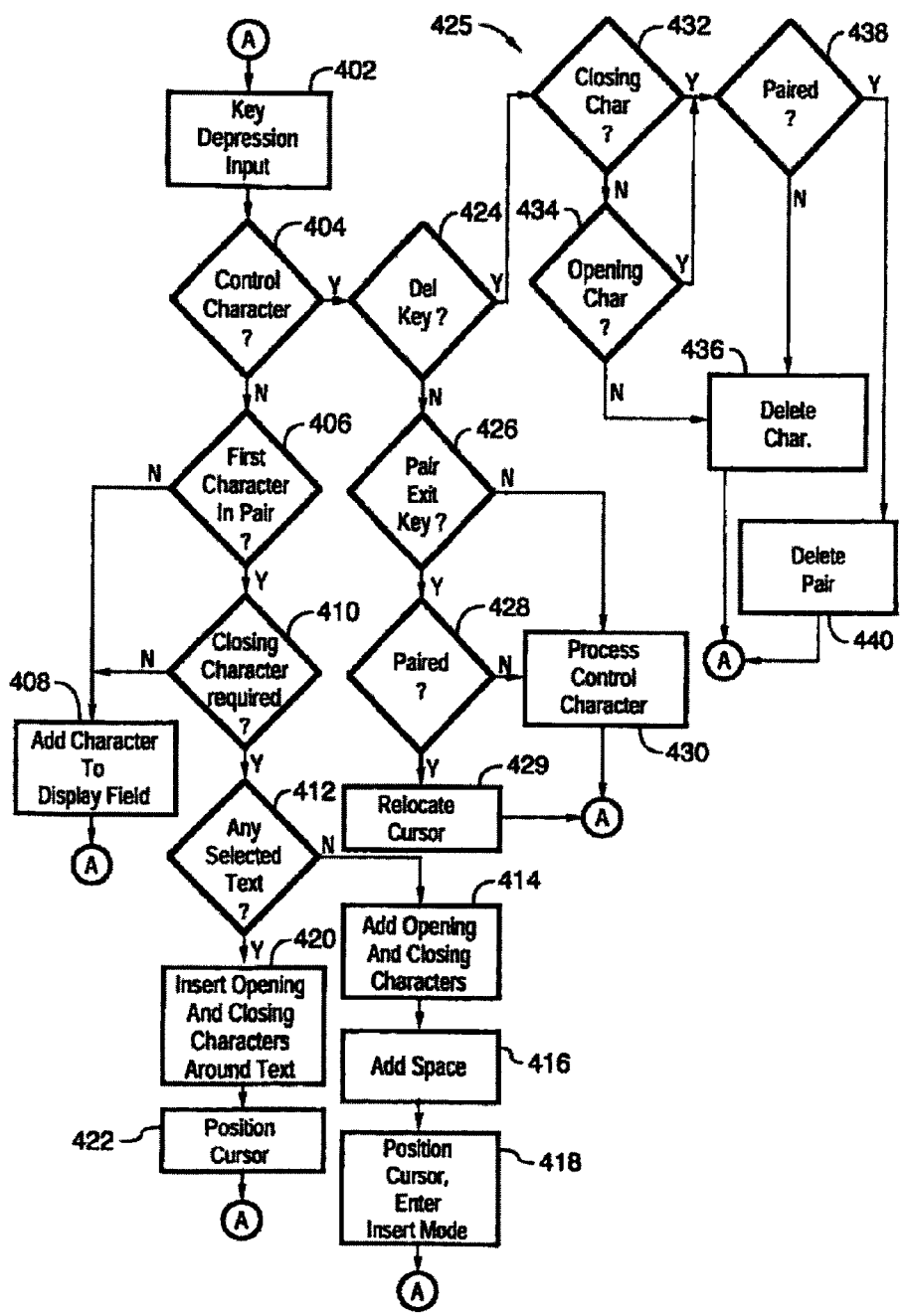
FIG. 4 is a general flow diagram showing the operation of the communications device according to embodiments of the present invention.

FIG. 4 is a general flow diagram 400 of the major steps of the autotext feature of the present invention. The process begins with keyboard event, namely an input from the depression of a key on the keyboard 32 or manipulation of the thumbwheel 28 of the device 10 (step 402). Keyboard driver 62 detects a keyboard event using methods known in the art, for example, by periodically polling the electrical lines of the keyboard or by receiving a hardware interrupt, and maps the particular electrical signal to codes stored in a look up table or other buffer. Keyboard events may be mapped to "input character" codes or to "control character" codes. "Input characters" are those characters that are added to the display field 72 and displayed on the screen 22, for example alphanumeric characters and right and left bracket characters, among other things. In one embodiment, the input character code references used may include the standard Unicode Set. "Control characters" correspond to keyboard events that are used to control the operating system 60 and/or specialized applications such as the text input application 66, for example commands to open menus and dialog boxes, and commands to navigate in the text in the display field such as move the display cursor, select text, delete text, etc.

Once a keyboard event is mapped to its corresponding code, the code is passed to the text input application 66, where the autotext module 68 determines if the keyboard event corresponds to a control character or, alternatively, to an input character (step 404). If the keyboard event corresponds to a control character, the control character is processed by a control character processing routine that is discussed further below, If the keyboard event corresponds to an input character code, the input character is processed as follows. The autotext module 68 determines if the input character corresponds to the first or opening character in a character pair (step 406). In particular, the autotext module has access to a predefined list of special pair character codes that correspond to the special characters that are typically the opening character in a character pair. The autotext module also has access to a list of closing characters codes that correspond to the opening characters. By way of example, Table 1 below shows an exemplary list of opening characters and corresponding closing characters (aligned underneath the opening characters) according to a preferred embodiment of the invention. For ease of explanation, the list in Table 1 shows that actual characters rather than the character codes (for example, the closing bracket "}"0 is shown in Table 1 rather than its corresponding character code Unicode(Hex) 007D). Part or all of the lists may be hard coded as part of the autotext module 68, or could be a user configurable list stored in semi-persistent memory such as flash memory 24.

TABLE 1

| LIST OF PREDETERMINED CHARACTER PAIRS | | | | | |
|---|---|---|---|---|---|
| OPENING CHARACTER | ( | { | [ | < | " |
| CLOSING CHARACTER | ) | } | ] | > | " |

If the autotext module 68 determines that the input character is not one of the predetermined opening characters, then the input character is added to the display field 72 (step 408), and the text input application 66 instructs the operating system 60 to display the input character on an input display area of screen 22 followed by a cursor indicating the next input location, after which the device waits for the next key depression (step 402).

In one embodiment of the invention, in the event that the input character is determined in step 406 to be a first or opening character in a character pair, the autotext module 68 then checks to see if the opening character is part of a sequence of characters that would not normally require the corresponding closing character (step 410). For example, electronic body language such as ":(", commonly recognized by committed e-mail users as a frown face, would not require a closing character. In this regard, the autotext module 68 has access to a predefined first of character code sequences that do not normally require a closing character. The list of excluded sequences could, in some embodiments, be user configurable. In step 410, the autotext module 68 looks at the just entered character code of the opening character in combination with previously input character or characters (which are stored in display field 72) and determines if the combination results in a character code sequence in the predetermined list of excluded sequences (Le. those that do not require a closing character, If a determination is made that a closing character is not needed, then the opening character is added to the display field 72 (step 408), and text input application 66 instructs the operating system 60 to display the opening character on an input display area of screen 22 followed by a cursor indicating the next input location, after which the device waits for the next key depression (step 402).

Returning now to step 410, if a determination is made that the opening character will require a corresponding closing character, then the autotext module 68 checks the appropriate pointers maintained by the text input application 66 to determine if any previously input text in the display field 72 has been highlighted for block processing —or "selected", as commonly known in the art (step 412). In the event that no text is selected, the autotext module 68 adds both the opening character and its corresponding closing character to the display field 72 and the operating system 60 is instructed to display the opening character followed by the corresponding closing character on the display 22 (step 414). In a preferred embodiment, the autotext module 68 then automatically adds a trailing space character after the closing character of the character pair to the display field 72 and causes the space to be displayed on the screen 22 (step 416). The autotext module 68 then causes the cursor position pointer 74 to point to a location in the display field 72 (and the cursor to be located on display 22) so that the next character input through the keyboard will be inserted between the opening and closing characters of the character pair (step 418). In addition to positioning the cursor, the autotext module 68 ensures that the text input application 66 is in what is commonly known as "INSERT" mode, such that subsequently input characters will be inserted at the cursor location, pushing trailing characters (including the closing character) to the right without overwriting them. After step 418, the autotext module 68 returns to step 402 to wait for the next keyboard event.

Turning again to step 412, in the event that previously input characters have been selected, the autotext module 68 causes the input opening character to be inserted into the display field 72, and on screen 22, into a location preceding the first character of the selected text, and causes the corresponding closing character to be inserted into the display field 72, and on screen 22, into a location immediately after the last character of the selected text (step 420), thereby framing the selected text within the character pair without requiring the user to enter the closing character. In a preferred embodiment, a space character is added after the closing character. The cursor location (and cursor position pointer 74) is updated so that the next character will be added to the immediate right of the space that trails the closing character (step 422), after which the autotext module 68 loops back to step 402 to wait for the next keyboard event.

Turning again to step 404, control character processing will now be explained in greater detail. In embodiments of the invention, special delete processing for character pairs may be provided. In such embodiments, if a keyboard event corresponds to a control character, the autotext module 68 checks to see if the keyboard event was the depression of the delete key (step 424), and if so, performs a delete processing routine, indicated generally by reference 425, which will be described in greater detail below.

When a user wants to exit from inside a character pair, they can use conventional scroll key inputs to move the input cursor until visual feedback from the screen 22 indicates that the input cursor is positioned after the closing character and the trailing space. For example, in one embodiment of device 10 depression of the "alt" key combined with a single increment downward roll of discrete thumbwheel 28 is interpreted as the control character for moving the input cursor (and, in the figurative sense, the corresponding cursor location pointer) a single location to the right. Some embodiments, such as that shown in FIG. 4, may be configured to permit a user to automatically skip to the end of a character pair (and all text between the character pair) upon entry of a key stroke or key stroke combination that is associated with a predetermined "quick exit" control character. For example, in one embodiment, the predetermined "quick exit" control character could be mapped to the depression of the "cntrl" key and the "alt" key simultaneously. Having a quick exit function may be particularly useful in a situation where the user has returned to edit previously entered text within a character pair, as it can save the user the time of having to scroll over several characters to get to the end of the character pair. In embodiments configured for a "quick exit" from a character pair, the autotext module 68 is configured to check if the control character generated by a keyboard event corresponds to the predetermined "quick exit" character (step 426). If it does not then the control character is processed by the text input application 66 according to its predetermined function (step 430).

It is possible that a "quick exit" character may have a different function associated with it when it is not entered within a character pair, and accordingly, if in step 426 it is determined that the "quick exit" character has been entered, the autotext module 68 then performs a check to see if the input cursor is actually within a character pair at the time that the "quick exit" entry is made (step 428). If the "quick exit" character has been entered outside of a character pair, the "quick exit" character is processed according to its alternative function, or ignored as an incorrect entry if it has no alternative function (step 430).

If in step 428 a determination is made that the "quick exit" character was made within a character pair, the input cursor location and corresponding cursor position pointer are relocated to after the closing character of the character pair (in particular, to after the space character that trails the closing character) (step 429).

One possible method according to embodiments of the invention for detecting if the input cursor is located within a character pair in step 428 will now be discussed. In such an embodiment, the autotext module 68 uses Last In First Out (LIFO) stacks 76 in memory. In step 428, with cursor position pointer acting as a starting point reference, the autotext module first scans the characters in the display field 72 preceding the input cursor to locate the opening character, and then scans the succeeding characters to locate the corresponding closing character. Using the LIFO stacks 76, the autotext module 68 can track nested character pairs to ensure that it associates the correct opening character with the correct closing character, and can also be configured to detect incorrect character pairings and generate an error code or signal for the user of an incorrect pairing. FIG. 5 shows pseudo code, indicated by reference 500, illustrating an exemplary routine for scanning characters preceding the cursor location to detect an opening character, and FIG. 6 shows pseudo code, indicated by reference 600 illustrating an exemplary routine for scanning characters subsequent to the cursor location to detect the correct closing character corresponding to the opening character.

During the backward scan routine 500, the autotext module continues scanning backward from the cursor location a character at a time until it locates an opening character that is not paired with a closing character that has already been added to the LIFO stack. The use of LIFO stack to track opening and closing characters scanned during the backward scan routine 500 allows the autotext module to ignore character pairs that are nested within the target character pair. An error is signalled if an unmatched nested character pair is located during the backward scan. The backward scan routine 500 returns the found opening character as variable j, and can also return the location of the opening character as variable i if such location information is needed.

During forward scan routine 600, which is performed after backward scan routine 500, the autotext module continues scanning forward from the cursor location a character at a time until it locates a closing character that is not paired with an opening character that has already been added to the LIFO stack during the forward scan routine 600. The use of LIFO stack to track opening and closing characters scanned during the forward scan routine 600 allows the autotext module to ignore character pairs that are nested within the target character pair. An error is signalled if an unmatched nested character pair (for example "[ }") is located during the backward scan. When the target closing character is found, a check is made to determine if it corresponds to the opening character found during backward scan routine 500, and if not, an error is signalled that an unmatched pair has been entered, and if so, the forward scan routine 600 returns the location of the target closing character as variable n, thereby providing the information needed to perform a "quick exit" by relocating the cursor to after the closing character of the character pair.

Referring again to FIG. 4, the delete processing routine 425 will now be explained in greater detail. Routine 425 permits both the opening and closing characters of a character pair to be simultaneously deleted when either the opening character or the closing character is selected for deletion by the user. For example, when the delete key is pressed, the autotext module 68 checks to see if the character to be deleted (as determined by the input cursor location) is a closing character or an opening character of one of the predetermined character pairs (steps 432, 434). If not, the character deletion is carried out in the normal manner (step 436). If however, the character to be deleted is either an opening character or a closing character of one of the predetermined character pairs, the autotext module 68 performs forward and backward scanning routines (for example routines 500) 600) to determine if the opening (or closing) character is paired with its corresponding closing (or opening) character, and also to determine the location of the opening and closing characters if a pair exists (step 438). If a character pair is found, then both the opening and closing characters are deleted from the display field 72 and screen 22 (step 440). If no character pair is found, then only the character located adjacent the input cursor is deleted (step 436). It will be appreciated that delete routine 425 could also be configured to work with the backspace function.

Thus, in summary, it will be appreciated from the flowchart of FIG. 4 that upon detecting that a user of the device 10 has entered a character that falls within the list of predetermined opening characters, the autotext module 68 causes both the opening character and its corresponding closing character, followed by a space character to be added to the display field 72 and displayed on the display 22, and positions the input cursor to locate any subsequently input characters within the opening and closing character pair. The user can exit from inside a character pair either by scrolling one character at a time, or can jump to after the closing character of the character pair by entering a predetermined quick exit key or key combination. A user can quickly encapsulate text within the opening and closing characters of a character pair by selecting the text and then entering the opening character (in some text editors that are configured to perform a block delete of selected text, it will be necessary to configure the editor to override such function when one of the predetermined opening characters is entered in combination with selected text).

The present invention saves the user the trouble of having to manually enter the closing character of a character pair and the trailing space that typically follows such a character. In reduced key configurations such as those commonly found in mobile devices, such a feature can be particularly time saving as some special pair closing characters, for example the character "}" may require the user to take a number of different actions to enter. Furthermore, such a feature ensures that the user does not forget the closing character.

Figure 7:
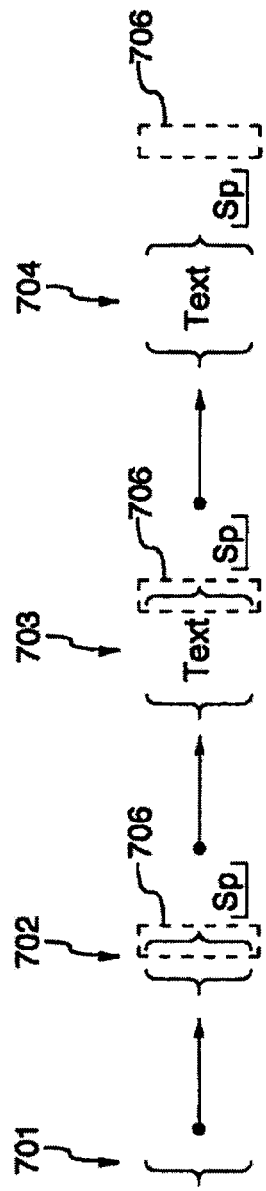
FIG. 7 is a flow diagram showing exemplary information displayed on a display screen of the mobile communication device of FIG. 1 according to embodiments of the invention.

In order to provide a better understanding of the invention, an illustrative example of the operation of the device 10 according to embodiments of the invention will be explained with reference to FIG. 7. FIG. 7 shows, in sequential order, characters stored in the display field 72 and shown on display 22 in response to a series of keyboard events. In the illustrated example, a user enters the opening pair character "{", which, as indicated by reference 701, is added to the display field 72 and displayed on display 22. The autotext module 68 determines that the entered character falls within the list of predetermined special character pairs, and, as indicated by reference 702, causes the corresponding closing character "}" and a trailing space Sp to be automatically inserted. Additionally, the input cursor, represented by dashed line box 706, is positioned at the same location as the closing character "}" so that any subsequently entered characters will be inserted before the closing character "}" and after the opening character "{", with the closing character pushed further right with each subsequent character entry. In the illustrated example, the user enters the characters "Text", as indicated by reference 703. As indicated by reference 704, upon the user entering the designated exit key or key combination, the input cursor 706 jumps over the closing character "}" and the trailing space Sp to the next available input location.

In some embodiments, the autotext module may be configured to determine in step 414, by using forward and backward scanning routines similar to routines 500, 600, if it is processing a nested character pair, and if so, to skip adding a trailing space after the closing character. In some embodiments, the autotext module 68 may be configured not to insert any trailing space after the closing pair character. In some embodiments, the autotext module 68 may be configured to automatically insert spaces immediately after the opening character and immediately before the closing character of a character pair. In some embodiments, the location of automatically inserted spaces in and around the predefined character pairs could be user configurable.

In some embodiments of the invention, the autotext module 68 is configured to automatically insert a closing character sequence that corresponds to an opening character sequence, and position the input cursor between the opening and closing character sequences. As noted above, there are situations when an opening sequence of characters is paired with a closing sequence of characters with information nested between. For example HTML source code is structured using paired opening and closing sequences as: <HEAD>opening character sequence paired with the </HEAD>closing sequence, or opening <TITLE>paired with closing </TITLE>, or <TABLE> with </TABLE>. It will be appreciated that the methods described above in respect of character pairs consisting of a single opening and a single closing character are easily adaptable for use with opening and closing character sequences. Conventional text prediction routines could be used to speed up entry of the opening sequence, with the autotext module of the present invention automatically inserting the corresponding closing sequence and positioning the input cursor.

In some embodiments, all or some of the functions of the autotext module 68 could be implemented as an application separate from any specific text input application 66, thus allowing several text input applications to call on and use a single autotext module 68. Functions of the autotext module 68 and text input application could also be integrated into the operating system 60.

It will be appreciated that in addition to automatic pair character insertion, the device 10 could also have other autotext functions such as those described, for example, in the above mentioned U.S. Pat. No. 6,396,482. Although the device 10 has been described as a mobile communications device, embodiments of the present invention could also be applied to electronic devices that are neither communications devices or mobile. In addition to the physical keyboard described above, the automatic text insertion of the present invention could work with virtual keyboard systems (for example, on-screen stylus input systems) and other character entry systems as well.

Although the invention has been described above in the context of a left to right language system such as the English language, it could also be applied to other language systems such as Arabic and Japanese.

The above-described embodiments of the present invention are intended to be examples only. Alterations, modifications and variations may be effected to the particular embodiments by those skilled in the art without departing from the scope of the invention, which is defined by the claims appended hereto.

The invention claimed is:

1. A method for use in an electronic device having a display for displaying characters, comprising:
receiving an input reflecting selection of a character;
determining that the selected character is an opening character of a character set including a corresponding closing character; and
automatically displaying on the display the closing character.

2. The method of claim 1, further comprising:
determining, when an input cursor is located between displayed opening and closing characters of the character set, if a predetermined exit input is received, and if so relocating the input cursor for subsequent input characters to be inserted on the display after the closing character.

3. The method of claim 1, further comprising:
determining if any previous input character has been selected, and if so displaying on the display the opening character and the closing character with the selected character framed therebetween.

4. The method of claim 1, further comprising:
determining if any previous input character has been selected, and if so displaying on the display the opening character and the closing character with the selected character framed therebetween, and if not locating an input cursor for subsequent input characters to be inserted between the opening and closing characters on the display.

5. The method of claim 1, further comprising:
automatically inserting a space character after the closing character on the display.

6. The method of claim 1, wherein the character set comprises at least one of the open and close bracket pairs { }; ( ) < >; or [ ].

7. The method of claim 1, further comprising:
determining that a predetermined delete input is received; and
determining if an input cursor is located to delete either the opening character or the closing character, and if so deleting both the opening and closing characters.

8. An electronic device, comprising:
a display for displaying characters; and
a processor connected to the display, the processor being configured to
receive an input reflecting selection of a character;
determine that the selected character is an opening character of a character set including a corresponding closing character; and
automatically display on the display the closing character.

9. The device of claim 8, wherein the processor is further configured to:
determine, when an input cursor is located between displayed opening and closing characters of the character set, if a predetermined exit input is received, and if so relocate the input cursor for subsequent input characters to be inserted on the display after the closing character.

10. The device of claim 8, wherein the processor is further configured to:
determine if any previous input character has been selected, and if so display on the display the opening character and the closing character with the selected character framed therebetween.

11. The device of claim 8, wherein the processor is further configured to:
determine if any previous input character has been selected, and if so display on the display the opening character and the closing character with the selected character framed therebetween, and if not locate an input cursor for subsequent input characters to be inserted between the opening and closing characters on the display.

12. The device of claim 8, wherein the processor is further configured to:
automatically insert a space character after the closing character on the display.

13. The device of claim 8, wherein the character set comprises at least one of the open and close bracket pairs { }; ( ) < >; or [ ].

14. The device of claim 8, wherein the processor is further configured to:
determine that a predetermined delete input is received; and
determine if an input cursor is located to delete either an opening or a closing character of a predetermined character set, and if so delete both the opening and closing characters.

15. A computer program product comprising a non-transitory computer readable medium carrying program code means for use in an electronic device having a display for displaying characters, the program code means comprising:
means for receiving an input reflecting selection of a character;
means for determining that the selected character is an, opening character of a character set including a corresponding closing character; and
means for automatically displaying on the display the closing character.

* * * * *